April 1, 1958

D. A. ROGERS, JR 2,829,191

POLYMERIZABLE POLYESTER AND VINYLIDENE MONOMER
RESINOUS COMPOSITION AND ELECTRICAL
CONDUCTOR INSULATED THEREWITH

Filed April 7, 1954

WITNESSES
Edwin E. Bauder
William G. Addison

INVENTOR
Dow A. Rogers, Jr.
BY
Frederick Shoop
ATTORNEY

United States Patent Office 2,829,191
Patented Apr. 1, 1958

2,829,191

POLYMERIZABLE POLYESTER AND VINYLIDENE MONOMER RESINOUS COMPOSITION AND ELECTRICAL CONDUCTOR INSULATED THEREWITH

Dow A. Rogers, Jr., Pittsburgh, Pa., assignor to Westinghouse Electric Corporation, East Pittsburgh, Pa., a corporation of Pennsylvania Application April 7, 1954, Serial No. 421,590

7 Claims. (Cl. 174—110)

The present invention relates to electrical insulation and has particular reference to completely reactive synthetic copolymer resinous compositions suitable for use as insulation for electrical apparatus including conductors, windings, coils and the like.

In the building of electrical apparatus, particularly high-voltage generators and the like, the insulation material used should be relatively flexible and it should have low dielectric losses at the elevated temperatures encountered in service of these generators. The insulation also should have high thermal stability and it should undergo little, if any, decomposition due to high temperature operation of the electrical apparatus.

Heretofore copolymerizable resinous compositions have been proposed for application as insulation for electrical apparatus such as high-voltage generators. Certain of these compositions, however, have been found to be wanting in some of the above essentials. In general, for example, such compositions either do not have satisfactory thermal stability or they have high dielectric losses or relatively high moduli of elasticity or evolve relatively large quantities of heat during polymerization whereby cracks and voids form therein which results in ultimate failure of the insulation.

The object of the present invention is to provide a completely reactive synthetic copolymer resinous composition which when applied to electrical apparatus provides an insulating material therefor having outstanding physical and electrical properties.

Another object of the invention is to provide electrical conductors wrapped with insulation solidly impregnated with a cured synthetic copolymer resinous composition.

Figure 1:
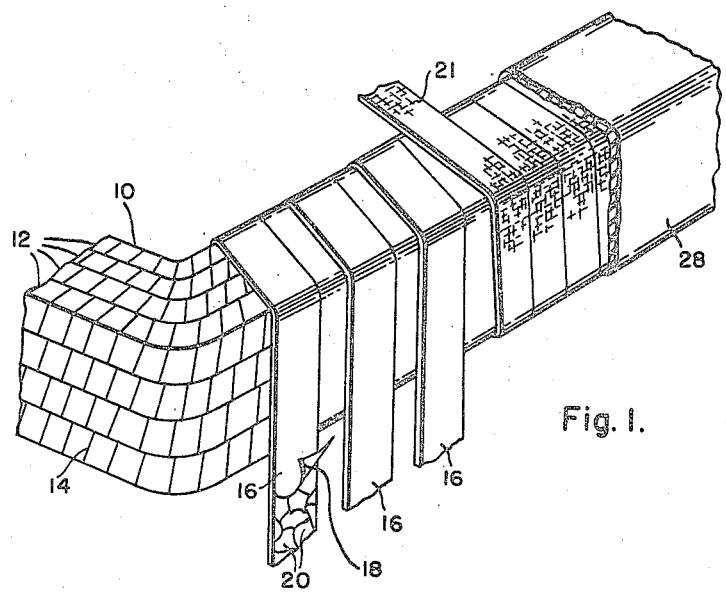
Figure 2:
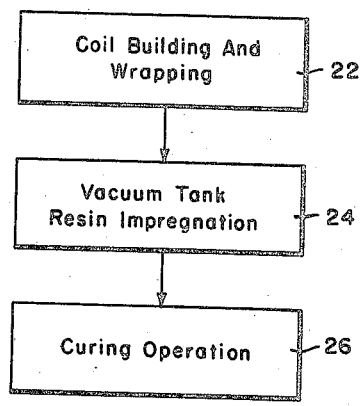

To indicate more fully the advantages and capabilities of the present invention, together with other and further objects thereof, reference is made to the following description taken in conjunction with the accompanying drawing wherein:

Figure 1 is a fragmentary view in perspective of a coil constructed in accordance with this invention; and Fig. 2 is a schematic diagram of apparatus suitable for use in preparing insulated electrical apparatus.

It will be understood that embodiments of the invention, other than those illustrated and described, employing the same or equivalent principles may be used and that structural changes may be made as desired without departing from the true scope of the invention.

Broadly, the completely reactive synthetic copolymer resinous compositions of this invention comprise (A) from 5% to 95% by weight of a resinous polyester obtained by reacting (a) the reaction product of a dihydric phenol and a material selected from the group consisting of alkylene oxides and alkylene halohydrins, such reaction product having only two reactive alcoholic hydroxyl groups, with (b) at least one saturated dicarboxylic acid having at least 4 carbon atoms per molecule, and anhydrides thereof, said dicarboxylic acid providing an average of from 4 to 12 carbon atoms per molecule, and (c) at least one olefinically unsaturated dicarboxylic acid and anhydrides thereof, the mole proportion of the (b) saturated dicarboxylic acids to the (c) olefinically unsaturated dicarboxylic acids being within the range of about 1:1 to 8:1, and (B) from 95% to 5% by weight of at least one liquid reactive unsaturated monomer having the group $>C=C<$.

The order in which the (a) reaction product of a dihydric phenol and alkylene oxides or alkylene halohydrins, the (b) saturated dicarboxylic acids, and (c) olefinically unsaturated dicarboxylic acids are brought into contact with one another and reacted is immaterial in the preparation of the compositions of this invention. Thus, (a) and (b) can be reacted together and (c) added thereto and reacted, or (a), (b) and (c) can be passed simultaneously in separate streams into a reaction zone, or (a) and (c) may be reacted first and (b) then reacted therewith, or the various components may be reacted in any other desired order.

In preparing the (A) resinous polyester portions of the synthetic copolymer resinous compositions there is produced initially the (a) reaction product of a dihydric phenol and an alkylene oxide or alkylene halohydrin. Such reaction products may be characterized as hydroxyalkyl ethers. Phenols which are suitable for use in preparing the hydroxy-alkyl ethers in accordance with this invention include those which contain two phenolic hydroxy groups per molecul. Polynuclear phenols have been found to be particularly suitable and include those wherein the phenol nuclei are joined by carbon bridges, such for example as 4,4'-dihydroxy-diphenyl-dimethyl-methane (referred to hereinafter as bis-phenol "A"), 4,4'-dihydroxy-diphenyl-methyl-methane and 4,4'-dihydroxy-diphenyl-methane. In admixture with the named polynuclear phenols, use also may be made of those polynuclear phenols wherein the phenol nuclei are joined by sulfur bridges, such for example as 4,4'-dihydroxy-diphenyl-sulfone.

The hydroxy-alkyl ether starting material may be prepared, for example, by the direct reaction of an alkylene oxide such as ethylene oxide, propylene oxide or butylene oxide, or the like with bis-phenol "A." If desired, the hydroxy-alkyl ethers also may be prepared by reacting an alkylene halohydrin, for example, ethylene chlorohydrin, ethylene bromohydrin, propylene chlorohydrin, propylene bromohydrin, butylene chlorohydrin or the like with an alkali metal salt of bis-phenol "A."

When using an alkylene oxide the reaction may be carried out by agitating the bis-phenol "A" at a temperature between about 125° and 170° C. while adding alkylene oxide in small increments until the desired amount of the oxide has been introduced. If desired, a catalyst such as sodium or potassium hydroxide or a basic amine or acids such as sulphuric acid or phosphoric acid or the like may be utilized in small proportions to promote the reaction. The hydroxy-alkyl ether thus obtained advantageously may be separated from the reaction mixture by distilling off low boiling ingredients.

When using an alkylene halohydrin such as ethylene chlorohydrin the reaction may be carried out by heating the same with an alkali metal salt, for example, the sodium or potassium salt, of bis-phenol "A" at a temperature between about 60° C. and 120° C. in the presence of a liquid medium, for example, water or alcohol. The reaction usually is complete after the mixture has been heated for about 1 to 6 hours at the temperature indicated. The hydroxy-alkyl ether prepared in this manner may be separated from the reaction mixture by conventional purification procedures as, for example, by washing the reaction product with water to extract alkali metal halide, in this case sodium chloride, and then heating under vacuum to distill off lower boiling ingredients.

The hydroxy-alkyl ethers, prepared in accordance with the procedures described above then are esterified with (b) one or more saturated dicarboxylic acids having at least 4 carbon atoms per molecule, or anhydrides thereof, if any. The esterification reaction may be carried out in accordance with usual esterification procedures, for example, by heating the hydroxy-alkyl ether and the saturated dicarboxylic acid under reflux in the presence of an esterification catalyst such as hydrochloric acid, sulphuric acid, benzene sulfonic acid or the like.

More complete esterification is obtained if azeotropic distillation procedures are employed to carry off the water formed during the reaction. The removal of water during the esterification reaction may be facilitated by carrying out the esterification in the presence of a volatile organic liquid such as toluene, xylene or the like. The partially esterified product obtained may be separated from the reaction mixture in any convenient manner, for example by distillation.

Examples of saturated dicarboxylic acids or anhydrides thereof which are suitable for use in the esterification reaction described include succinic acid, glutaric acid, adipic acid, succinic anhydride, pimelic acid, suberic acid, azelaic acid and sebacic acid. These acids may be used singly or in any desired admixture of any two or more.

The esterified product thus obtained then is further reacted, following the general reaction procedure set forth above for the saturated dicarboxylic acids, with (c) at least one olefinically unsaturated dicarboxylic acid, or anhydrides thereof if any, to form the complete resinous polyester portion of the compositions of the invention. Examples of suitable olefinically unsaturated dicarboxylic acids or anhydrides thereof include maleic acid, fumaric acid, itaconic acid, citraconic acid, mesaconic acid, aconitic acid, maleic anhydride and citraconic anhydride. These aids may be used singly or in any desired mixture of any two or more.

From 5% to 95% by weight of the (A) resinous polyester thus prepared then is dissolved in from 95% to 5% be weight of a (B) liquid reactive unsaturated monomer having the group >C=C<, to yield a fluid resinous composition which will polymerize completely upon heating in the presence of one or more vinyl addition type polymerization catalysts. Examples of such catalysts are benzoyl peroxide, lauroyl peroxide, methyl ethyl ketone peroxide, t-butyl hydroperoxide, ascaridole, tert-butyl perbenzoate, di-t-butyl diperphthalate, ozonides, and similar catalysts in an amount of from 0.1% to 2% by weight, though somewhat larger or smaller amounts may be employed if desired. Polymerization accelerators such as cobalt naphthenate and azomethine also may be employed. Polymerization also may be effected through the utilization of actinic light.

In general, the compositions should contain about 5% to 95% by weight of the resinous polyesters and about 95% to 5% by weight of the liquid monomer, the preferred proportion being about 15% by weight of the resinous polyesters and about 85% by weight of the liquid monomer. It is only when the polymerizable resinous compositions contain the various ingredients in the proportions indicated above that the compositions exhibit the improved physical and electrical properties described hereinbefore.

The polymerizable compositions obtainable in accordance with the present invention usually cannot be stored conveniently in mixed form since polymerization generally will take place even at room temperatures within a comparatively short period of time. To overcome or substantially minimize this difficulty it is preferred to incorporate a relatively small proportion of one or more polymerization inhibitors in the mixture of resinous polyesters and reactive unsaturated monomer. Polymerization inhibitors which are suitable for use in accordance with this invention include substituted phenols and aromatic amines. More specific examples of suitable polymerization inhibitors include hydroquinone, resorcinol, tannin, sym. alpha, beta naphthyl p-phenylene diamine, and the like. The inhibitor preferably is employed in relatively small proportions. Thus, amounts less than about 1.0% may be used, with amounts as small as about 0.01% to about 0.1% generally being sufficient.

Examples of liquid reactive unsaturated vinylidine monomers having the group >C=C< which are suitable for use in accordance with this invention include monostyrene, vinyl toluene, alphamethylstyrene, 2,4-dichlorostyrene, paramethyl styrene, vinyl acetate, methyl methacrylate, ethyl acrylate, diallyl phthalate, diallyl succinate, diallyl maleate, allyl alcohol, methallyl alcohol acrylonitrile, methyl vinyl ketone, diallyl ether, vinylidene chloride, butyl methacrylate, allyl acrylate, allyl crotonate, 1,3-chloroprene, and divinyl benzene, as well as mixtures of two or more of any of these monomers.

The invention now will be described with particular reference to the preparation and impregnation of coils suitable for use in high-voltage generators. Referring to Fig. 1 of the drawing, there is illustrated a coil 10, comprising a plurality of turns of conductors 12. Each turn of the conductor 12 consists essentially of a copper bar or wire wrapped with turn insulation 14. The turn insulation 14 preferably is prepared from a fibrous sheet or strip impregnated with a bonding resinous insulation. While the bonding resinous insulation may consist solely of a coating of uncured varnish or resin, it is preferred that it comprise a wrapping of fibrous material treated with a bonding resin. Glass fiber cloth, paper asbestos cloth or asbestos paper treated with a resin, however, can be used with equally satisfactory results. The resin applied to the turn insulations to bond them together may be a phenolic resin, an alkyd resin, a melamine resin or the like, or mixtures of any two or more of these.

The turn insulation is not adequate to withstand the severe voltage gradients that will be present between the conductor and ground when the coil is installed in a high-voltage generator. Therefore, ground insulation for the coil is provided by wrapping one or more layers of a composite mica tape 16 about the turns 12. Such composite tape 16 comprises a pliable backing sheet 18 having a layer of mica flakes 20 bonded thereto by a liquid resinous binder. The tape may be applied half lapped, butted or otherwise. Generally, a plurality of layers of the composite tape 16 are wrapped about the coil, 16 or more layers generally being used. To impart better abrasion resistance and to secure a tighter insulation a wrapping of a tape 21 of a tough fibrous material, for example, glass fiber, asbestos or the like is applied to the coil.

In Fig. 2 of the drawing there is a schematic illustration of the process steps which may be followed in preparing insulated electrical apparatus such as a coil in accordance with this invention. The first step 22 comprises the building and wrapping of a coil as described above. The coil so prepared then is introduced into a vacuum impregnating tank 24 and subjected to a heat drying and evacuating operation to remove substantially all moisture, air and other undesirable volatile material from the coil. The polymerizable resinous composition of this invention then is introduced into the tank until the coil is completely submerged in the composition.

While the coil is completely covered with the polymerizable resinous composition atmospheric air or a gas such as nitrogen or carbon dioxide is introduced into the impregnating tank under pressure to assist the polymerizable composition in penetrating completely into the interstices of the coil 10 and to assure substantially complete filling thereof. The impregnating treatment need not be of long duration. Ten minutes under pressure ordinarily is sufficient to completely impregnate and saturate small windings. Longer impregnation periods, however, for example up to several hours or more, insure the most complete penetration and saturation of larger coils and windings. It will be understood that while vacuum impregnation produces the best results, ordinary immersions under atmospheric conditions will give good results.

The impregnated but uncured coil then is withdrawn from the impregnating tank, drained briefly and subjected to a curing operation 26. In some cases the coil is wrapped with an impervious tape to prevent escape or loss of the liquid composition therefrom during the curing operation. One preferred method of curing the polymerizable resinous composition comprises placing the impregnated coil in a sizing and curing press provided with heating elements such as electric heating members, hot water pipes or the like. The polymerizable resinous composition may be cured on the coil while the same is in the mold by subjecting the same to heat or actinic light, or both, to polymerize and cure the resin to a hard, solid coating 28. In other cases the wrapped coils can be put in an oven and cured by heating to temperatures above 80° C., for example, up to about 135° C.

The following examples illustrate the preparation of resinous impregnating compositions in accordance with the present invention.

Example I (A) A mixture of about 5 moles of 4,4'-dihydroxy-diphenyl-dimethyl-methane and about 9 moles of an aqueous 40% solution of sodium hydroxide are heated under reflux at a temperature of about 80° to 85° C. and about 7 moles of ethylene chlorohydrin are added during a period of about 30 minutes. Heating is continued for an additional 3½ hours, after which time the mixture is washed with water and the product obtained from the mixture by distilling the same under vacuum.

(B) About 5.5 moles of the hydroxy-alkyl ether thus prepared are placed in a reaction vessel. A one liter per minute flow of nitrogen gas is bubbled through the material to enable sparging thereof, and heat and agitation are applied. When the temperature of the material being agitated has reached approximately 125° C., about 4 moles of adipic acid then are introduced into the reaction vessel. The resultant mixture then is heated to a temperature from about 150°–160° C. and held there for approximately 3 hours, the water of reaction formed during the esterification being carried off by the sparging gas.

(C) The esterified product thus obtained then is cooled to 125° C. whereupon one mole of maleic anhydride is introduced into the reaction vessel. The resultant mixture then is heated to a temperature of about 200° C. for a period of about 9 hours with agitation.

The product thus obtained is a viscous resinous polyester which may be dissolved in a liquid reactive unsaturated monomer such as monostyrene. A suitable polymerizable resinous composition is prepared by admixing about 15% by weight of the resinous polyester with about 85% by weight of monostyrene. The resultant mixture is a fluid resinous composition which when admixed with 1% benzoyl peroxide and subjected to heat or actinic light, or both, yields a solid, cured resinous copolymer having excellent physical and electrical properties.

A casting about one-eighth inch thick was made from a portion of a composition prepared in accordance with the procedure described in Example I and the tensile properties of the cast solid resinous composition then were determined. It was found that the composition had a tensile strength greater than about 150 pounds per square inch and an elongation greater than about 150%, measured at 100° C. The cured composition was shock-resistant and moderately rigid making it well suited for use as an impregnating insulation for high voltage electrical apparatus.

The electrical properties of another portion of the cured, solid resinous composition were determined and it was found that at a frequency of 60 cycles at 2 kilovolts and at temperatures of 25° C. and 124° C. the composition had power factors of about 0.21% and about 0.68%, respectively. It will be apparent that the power factor is exceptionally low at 124° C. When tested at higher frequencies, for example, up to about 100 kilocycles the power factors were found to be of substantially the same low order. The composition also was found to have a dielectric constant at 60 cycles of 2.77 at 25° C. and 2.72 at 124° C.

Example II

An hydroxy-alkyl ether is prepared according to the process set forth in part A of Example I, utilizing about 7 moles of ethylene oxide in place of the ethylene chlorohydrin. The resultant reaction mixture then is esterified with about 2 moles of succinic acid according to the process set forth in part B of Example I.

The esterified product so obtained then is reacted with about 1 mole of fumaric acid in accordance with the procedure described in part C of Example I.

The resinous copolymer thus obtained may be dissolved in a liquid reactive unsaturated monomer such as vinyl toluene. A satisfactory polymerizable fluid resinous composition is obtained by admixing about 25% by weight of the resinous copolymer with about 75% by weight of vinyl toluene.

Usually the resinous polyesters will be stored and transported separately from the liquid reactive unsaturated monomer until shortly before use. If desired, however, the resinous polyesters and the liquid monomer may be admixed and the resultant mixture may be filled into suitable containers for storage and shipping. If the latter procedure is followed it is desirable to incorporate an effective amount of one or more of the polymerization inhibitors described hereinabove in the mixture to prevent the same from polymerizing prior to the time of its intended use.

Both the amount of saturated dicarboxlic acid and the amount of olefinically unsaturated dicarboxylic acid employed in the resinous polyester portion of the compositions of the present invention are critical. It has been determined that satisfactory polymerizable resinous compositions are obtained only when the mole proportion of the saturated dicarboxylic acids to the olefinically unsaturated dicarboxylic acids is within the range of 1:1 to 8:1.

The resinous compositions of this invention are particularly well suited for use in practicing the insulated coil making processes of U. S. Patent No. 2,656,290, assigned to the assignee of the present invention. The composition of Example I, here, has been employed for making coils by the process of Example XII of Patent 2,656,290. These coils have outstanding electrical properties, even at temperatures of 125° C. and higher.

While the present invention has been described with reference to particular embodiments and examples, it will be understood, of course, that many modifications, changes and substitutions may be made therein without departing from the true scope of the invention.

I claim as my invention:

1. A polymerizable resinous composition comprising a solution of (A) from 5% to 95% by weight of a resinous polyester obtained by reacting (a) the reaction product of a dihydric phenol and a material selected from the group consisting of alkylene oxides and alkylene halohydrins, such reaction product having only two reactive alcoholic hydroxyl groups, with (b) at least one saturated dicarboxylic acidic component selected from the group consisting of dicarboxylic acids and anhydrides thereof having an average of from 4 to 12 carbon atoms per molecule, and (c) at least one olefinically unsaturated acidic component selected from the group consisting of dicarboxylic acids and anhydrides thereof, the mole proportion of the (b) saturated dicarboxylic acids to the (c) olefinically unsaturated dicarboxylic acids being within the range of 1:1 to 8:1, and (B) from 95% to 5% by weight of at least one liquid reactive unsaturated vinylidene monomer having the group $>C=C<$ capable of vinyl polymerization with the polyester.

2. A polymerizable resinous composition as set forth in claim 1 which contains at least one polymerization inhibitor.

3. A solid resinous copolymer comprising the cured reaction product of (A) from 5% to 95% by weight of a resinous polyester obtained by reacting (a) the reaction product of a dihydric phenol and a material selected from the group consisting of alkylene oxides and alkylene halohydrins, such reaction product having only two reactive alcoholic hydroxyl groups, with (b) at least one saturated dicarboxylic acidic component selected from the group consisting of dicarboxylic acids and anhydrides thereof having an average of from 4 to 12 carbon atoms per molecule, and (c) at least one olefinically unsaturated acidic component selected from the group consisting of dicarboxylic acids and anhydrides thereof, the mole proportion of the (b) saturated dicarboxylic acids to the (c) olefinically unsaturated dicarboxylic acids being within the range of 1:1 to 8:1, and (B) from 95% to 5% by weight of at least one liquid reactive unsaturated vinylidene monomer having the group $>C=C<$ capable of vinyl polymerization with the polyester, said solid resinous copolymer having been prepared by admixing (A) and (B) and heating the same in the presence of at least one vinyl addition polymerization catalyst.

4. A polymerizable resinous composition comprising a solution of (A) from 5% to 95% by weight of a resinous polyester obtained by reacting the reaction product of 4,4'-dihydroxydiphenyldimethylmethane and a material selected from the group consisting of alkylene oxides and alkylene halohydrins with adipic acid and maleic anhydride, the mole proportion of the adipic acid to the maleic anhydride being from 1:1 to 8:1, and (B) from 95% to 5% by weight of monostyrene.

5. A solid resinous copolymer comprising the cured reaction product of (A) about 15% by weight of a resinous polyester obtained by reacting about 5.5 mols of the reaction product of 4,4'-dihydroxydiphenyldimethylmethane and ethylene oxide with about 4 mols of adipic acid and about one mole of maleic anhydride, and (B) about 85% by weight of monostyrene, said solid resinous copolymer having been prepared by admixing (A) and (B) and heating the same in the presence of catalytic amounts of at least one vinyl addition polymerization catalyst.

6. An insulated conductor comprising an electrical conductor, solid insulation disposed upon the electrical conductor, the solid insulation having interstices therein, and a cured solid resinous copolymer disposed within the interstices of the solid insulation and completely filling them, the cured solid resinous copolymer comprising (a) from 5% to 95% by weight of a resinous polyester obtained by reacting (a) the reaction product of a dihydric phenol and a material selected from the group consisting of alkylene oxides and alkylene halohydrins, such reaction product having only two reactive alcoholic hydroxyl groups, with (b) at least one saturated dicarboxylic acidic component selected from the group consisting of dicarboxylic acids and anhydrides thereof having an average of from 4 to 12 carbon atoms per molecule, and (c) at least one olefinically unsaturated acidic component selected from the group consisting of dicarboxylic acids and anhydrides thereof, the mole proportion of the (b) saturated dicarboxylic acids to the (c) olefinically unsaturated dicarboxylic acids being within the range of 1:1 to 8:1, and (B) from 95% to 5% by weight of at least one liquid reactive unsaturated vinylidene monomer having the group $>C=C<$ capable of vinyl polymerization with the polyester, said cured solid resinous copolymer having been prepared by admixing (A) and (B) and heating the mixture in the presence of at least one vinyl addition polymerization catalyst.

7. An insulated conductor comprising an electrical conductor, a wrapping of mica tape disposed upon the electrical conductor, and a solid resin completely impregnating the tape, the solid resin comprising a cured resinous copolymer comprising (A) about 15% by weight of a resinous polyester obtained by reacting about 5.5 mols of the reaction product of 4,4'-dihydroxydiphenyldimethylmethane and ethylene oxide with about 4 mols of adipic acid and about one mol of maleic anhydride, and (B) about 85% by weight of monostyrene.

References Cited in the file of this patent

UNITED STATES PATENTS

| | | |
|---|---|---|
| 2,255,313 | Ellis | Sept. 9, 1941 |
| 2,464,568 | Flynn | Mar. 15, 1949 |
| 2,479,417 | Schulman et al. | Aug. 16, 1949 |
| 2,558,949 | Greenlee | July 3, 1951 |
| 2,593,411 | Caldwell | Apr. 22, 1952 |
| 2,618,616 | Tess et al. | Nov. 18, 1952 |
| 2,686,164 | Arvin et al. | Aug. 10, 1954 |
| 2,691,007 | Cass | Oct. 5, 1954 |